(12) United States Patent
Do Rosario et al.

(10) Patent No.: US 12,736,741 B2
(45) Date of Patent: Sep. 15, 2026

(54) ILLUMINABLE GLAZING UNIT

(71) Applicant: SAINT-GOBAIN GLASS FRANCE, Courbevoie (FR)

(72) Inventors: Jefferson Do Rosario, Herzogenrath (DE); Achim Zeichner, Herzogenrath (DE); Matthias Mandelartz, Herzogenrath (DE); Pierre Sarkissian, Herzogenrath (DE)

(73) Assignee: SAINT-GOBAIN SEKURIT FRANCE, Thourotte (FR)

(*) Notice: Subject to any disclaimer, the term of this patent is extended or adjusted under 35 U.S.C. 154(b) by 268 days.

(21) Appl. No.: 18/729,376

(22) PCT Filed: Jan. 25, 2023

(86) PCT No.: PCT/EP2023/051739
§ 371 (c)(1),
(2) Date: Jul. 16, 2024

(87) PCT Pub. No.: WO2023/144169
PCT Pub. Date: Aug. 3, 2023

(65) Prior Publication Data

US 2025/0085471 A1 Mar. 13, 2025

(30) Foreign Application Priority Data

Jan. 28, 2022 (EP) .................................... 22153875

(51) Int. Cl.
*F21V 8/00* (2006.01)
*G02B 5/00* (2006.01)

(52) U.S. Cl.
CPC ........... *G02B 6/0095* (2013.01); *G02B 5/003* (2013.01); *G02B 6/0043* (2013.01);
(Continued)

(58) Field of Classification Search
CPC .... G02B 5/003; G02B 5/0043; G02B 5/0065; G02B 5/0095; G02B 5/0073; G02B 5/009;
(Continued)

(56) References Cited

U.S. PATENT DOCUMENTS 10,639,869 B2 5/2020 Bauerle
2014/0240997 A1 8/2014 Massault et al.
(Continued)

FOREIGN PATENT DOCUMENTS

CN 102822007 A 12/2012
CN 103025580 A 4/2013
(Continued)

OTHER PUBLICATIONS

Notice of Allowance as issued in U.S. Appl. No. 18/729,363, dated Feb. 13, 2025.

(Continued)

*Primary Examiner* — Michael P Mooney
(74) *Attorney, Agent, or Firm* — CUSHMAN PARTNERS, LLC

(57) ABSTRACT

A glazing assembly having a light source for generating light that can be coupled into a first pane, an edge region, and an absorbing medium for absorbing light coupled into the first pane, which absorbing medium is arranged in the edge region, wherein the absorbing medium is designed as a first cover layer arranged on the first surface and/or on the second surface of the first pane, the first pane has at least one recess for receiving the light source, and wherein the first cover layer extends from the pane edge to the recess.

19 Claims, 3 Drawing Sheets

(52) U.S. Cl.
CPC ......... *G02B 6/0065* (2013.01); *G02B 6/0073* (2013.01); *G02B 6/009* (2013.01)

(58) Field of Classification Search
CPC ........... B32B 17/10036; B32B 17/1011; B32B 17/10293; B32B 17/10348; B32B 17/10541; B32B 17/10761; B32B 17/10935; B32B 17/10266; B32B 1/00; B32B 3/266; B32B 7/12; B32B 27/30; B60Q 3/208
See application file for complete search history.

(56) References Cited

U.S. PATENT DOCUMENTS

| | | | |
|---|---|---|---|
| 2014/0254187 A1 | 9/2014 | Massault et al. | |
| 2018/0074251 A1* | 3/2018 | Berard | G09F 13/18 |

FOREIGN PATENT DOCUMENTS

| | | | |
|---|---|---|---|
| CN | 104093598 | A | 10/2014 |
| CN | 104114392 | A | 10/2014 |
| CN | 104981348 | A | 10/2015 |
| CN | 108349219 | A | 7/2018 |
| CN | 108990414 | A | 12/2018 |
| DE | 202020107193 | U1 | 1/2021 |
| WO | WO 2007/077099 | A1 | 7/2007 |
| WO | WO 2010/049638 | A1 | 5/2010 |
| WO | WO 2013/053629 | A1 | 4/2013 |
| WO | WO 2013/110885 | A1 | 8/2013 |
| WO | WO 2014/060409 | A1 | 4/2014 |
| WO | WO 2014/167291 | A1 | 10/2014 |
| WO | WO 2015/095288 | A2 | 6/2015 |
| WO | WO 2018/178591 | A1 | 10/2018 |
| WO | WO2018178595 | A1 | 10/2018 |
| WO | WO 2019/105855 | A1 | 6/2019 |

OTHER PUBLICATIONS

International Search Report as issued in International Patent Application No. PCT/EP2023/051739, dated Apr. 14, 2023.

Office Action as issued in Chinese Patent Application No. 202380008247.5, dated Jan. 1, 2026.

* cited by examiner

ILLUMINABLE GLAZING UNIT

CROSS-REFERENCE TO RELATED APPLICATIONS

This application is the U.S. National Stage of PCT/EP2023/051739, filed Jan. 25, 2023, which in turn claims priority to European patent application number 22153875.4 filed Jan. 28, 2022. The content of these applications are incorporated herein by reference in their entirety.

The invention relates to a glazing assembly having a light source and a light outcoupling means, to a method for the production thereof and to the use thereof.

Motor vehicles have a degree of light distribution in their interior which, depending on requirements, provides weak or strong illumination of the interior. The lighting not only allows for orientation inside the vehicle, but also creates a pleasant atmosphere for vehicle occupants. Laminated panes in the form of glazing units composed of two or more glass or polymeric panes are used in vehicles as windshields, rear windows, side windows, and roof panels. With illuminable or illuminated glazing units, light from a light source is coupled into a planar light guide in the form of a pane of the glazing unit using total-internal reflection.

WO 2010/049638 A1, WO 2013/053629 A1, WO 2014060409 A1 or WO 2015/095288 A2 discloses the coupling of light into a glass pane via a side surface. If the light source is placed very close to the glass edge, light can be coupled into the light guide very efficiently and over the entire width of the light guide. Very homogeneous illumination across the surface can thereby be achieved. WO2013/110885 A1, WO2018178591 A1 or WO2019/105855 A1 disclose arranging the light source to a recess and thereby coupling the light into the pane.

The light reflections reach the edge region of the pane by being reflected multiple times at the parallel surfaces of the pane, in which edge region they can exit the pane again. This creates an illuminated edge region. This unwanted light effect in the edge region of the pane is very noticeable to an observer.

The object of the present invention is to provide an improved glazing assembly in which light coupled into the pane cannot be perceived as scattered light in the edge region of the pane.

This object is achieved by a glazing assembly according to claim 1. Preferred embodiments are apparent from the dependent claims.

The glazing assembly according to the invention comprises at least a first pane, a light source for generating light that can be coupled into the first pane, and a light outcoupling means for outcoupling light from the first pane, wherein the pane is provided to transmit at least some coupled-in light. The first pane has at least a first surface and a second surface. The light outcoupling means are provided to outcouple the light via one of the two surfaces. The first pane is connected to a second pane via an intermediate layer to form a laminated pane.

The glazing assembly also comprises an edge region which extends from a pane edge of the first pane over at least 1 mm to at most 500 mm on one of the surfaces (III, IV) of the first pane, and an absorbing medium for absorbing light coupled into the first pane, which absorbing medium is arranged in the edge region. The absorbing medium is designed as a first cover layer. Since light is not intended to be coupled out at the edges of the laminated pane, the edge region of the first pane comprises the cover layer which absorbs the scattered light. This is a low-effort way to prevent scattered light in the edge region of the laminated pane.

It is preferably provided for the first cover layer to be arranged on the first surface of the first pane. Alternatively or additionally, the first cover layer can be arranged on the second surface (III) of the first pane.

In a particularly preferred embodiment, the second pane has a second cover layer. The scattered light is thereby absorbed in the edge region of both main surfaces of the laminated pane. The first cover layer can extend from the pane edge of the first pane over 1 mm to 500 mm, preferably 10 mm to 150 mm, particularly preferably 10 mm to 15 mm. In particular, the first cover layer and the second cover layer overlap, at least in part, in the viewing direction through the laminated pane.

In a development of the invention, the first cover layer and/or the second cover layer are non-transparent. In other words, the first and second cover layer can be opaque. The term "opaque" describes a lack of transparency. "Opaque" in terms of the invention means that an observer cannot see through the intermediate layer or cover layer.

The cover layers are also referred to as cover prints or black prints. The cover print is made of a printing ink. The first cover layer and/or the second cover layer can be made of an opaque enamel, preferably applied as a screen or digital print. The enamel can contain glass frits and/or mineral frits and optionally at least one pigment, preferably glass frits and/or mineral frits based on oxides selected from boron, bismuth, zinc, silicon, aluminum and sodium. The pigment provides the opacity of the cover layer. The pigment can be a black pigment, such as carbon black, aniline black, bone black, iron oxide black, spinel black and/or graphite. Alternatively, the first and/or second cover layer can be designed as an adhesive tape, in particular a black adhesive tape, or as a base layer, a so-called primer. The primer can comprise a sol-gel layer made of silicon oxide mixed with other inorganic oxides. The cover layers can have a layer thickness of 5 μm to 15 μm.

In a further embodiment, the laminated pane comprises a circumferential pane edge, wherein the absorbing medium is arranged at least in portions along the circumferential pane edge, or the absorbing medium can extend circumferentially along the entire circumferential pane edge. The laminated pane has a viewing region in which the laminated pane does not have a cover layer. The viewing region of the laminated pane accounts for at least 30%, preferably 50%, of the surface area of the laminated pane. If the laminated pane is designed as a roof panel or windshield, the viewing region can account for at least 70% or at least 80% of the surface area of the laminated pane.

In a further embodiment, the light source can comprise at least one or more light-emitting diodes (LED). This type of light source is particularly bright and effective.

The first pane has at least one recess for receiving the light source. As a result, the light scattered into the surroundings outside the laminated pane can be reduced and light can be coupled into the first pane more effectively. In a glazing assembly having a recess in the first pane, the first cover layer can extend from the pane edge to the recess. In case of an assembly in the recess, the light source can be covered by the second cover layer in the viewing direction.

In principle, all electrically insulating substrates that are thermally and chemically stable as well as dimensionally stable under the conditions of production and of use of the laminated pane are suitable as the first pane and the second pane.

The first pane and the second pane preferably contain glass, particularly preferably float glass made of clear glass, very particularly preferably diamond glass. Alternatively, the panes can also contain flat glass such as soda lime glass, borosilicate glass or quartz glass, or clear plastics, rigid clear plastics, in particular polyethylene, polypropylene, polycarbonate, polymethyl methacrylate, polystyrene, polyamide, polyester, polyvinyl chloride, and/or mixtures thereof. The first pane and/or the second pane are preferably transparent, in particular for use of the panes as a roof panel, windshield or rear window of a vehicle or other uses where a high degree of light transmission is desired. In particular, at least the first pane and preferably also the second pane consists of clear glass.

A coating, in particular a pane or an object, is understood to be transparent if the coating, the pane or the object has a transmittance in the visible spectral range of greater than 20%, preferably 50%, particularly preferably greater than 70%, in particular greater than 85%.

However, for panes that are not situated in the traffic-relevant field of vision of the driver, for example for roof panels, transmission can also be much lower, for example greater than 5%. For this purpose, for example, the second pane and/or the intermediate layer can be tinted or colored.

The thickness of the first pane and/or the second pane can vary widely and thus be ideally adapted to the requirements of the individual case. Preferably, standard thicknesses of 1.0 mm to 25 mm, preferably of 1.4 mm to 2.5 mm for vehicle glass and preferably of 4 mm to 25 mm for furniture, devices and buildings are used. The size of the panes can vary widely and depends upon the size of the use according to the invention. The first pane and the second pane have surfaces of 200 $cm^2$ up to 20 $m^2$, as is usual, for example, in vehicle construction and the architectural sector.

The composite pane can have any three-dimensional shape. Preferably, the three-dimensional shape has no shadow zones, thereby allowing, for example, coating with further coatings by cathode sputtering. Preferably, the panes are planar or slightly or markedly curved in one or more spatial directions. In particular, planar substrates are used. The panes can be colorless or tinted.

The first pane and the second pane are connected to one another via at least the intermediate layer. The intermediate layer is preferably transparent or tinted or colored. The intermediate layer preferably contains or is made of at least one plastics, preferably polyvinyl butyral (PVB), ethylene vinyl acetate (EVA), and/or polyethylene terephthalate (PET). The intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The intermediate layer can be formed by one or even by a plurality of films arranged one over another, wherein the thickness of a film is preferably from 0.025 mm to 1 mm, typically 0.38 mm or 0.76 mm. The intermediate layers can preferably be thermoplastic, and, after lamination, the first pane, the second pane, and any other intermediate layers be bonded to one another. So-called acoustic damping intermediate layers preferably consisting of three PVB layers, wherein the middle layer is designed to be softer than the two outer layers, are particularly advantageous.

The intermediate layer can also have a functional layer, in particular a layer reflecting infrared radiation, a layer absorbing infrared radiation, a layer absorbing UV radiation, an at least partially colored layer, and/or an at least partially tinted layer. For example, the thermoplastic intermediate layer can thus also be a bandpass filter.

The terms "first pane" and "second pane" have been chosen in order to differentiate between the two panes of a laminated pane according to the invention. No statement about geometric arrangement is associated with the terms. When the composite pane according to the invention is, for example, provided in an opening in, for example, a vehicle or a building, in order to separate the interior from the external environment, the first pane can face the interior or the external environment.

In an advantageous embodiment, the laminated pane is a roof panel of a motor vehicle, wherein the first pane is the inner pane and the second pane is the outer pane.

Furthermore, the first pane and/or the second pane can have additional suitable coatings, for example an anti-reflection coating, an anti-adhesion coating, an anti-scratch coating, a photocatalytic coating, a sun protection coating, and/or low-e coating.

Furthermore, the glazing assembly can optionally comprise additional functional elements, in particular electronically controllable optical elements, for example PDLC elements, electrochromic elements or the like, which are typically arranged between the first pane and the second pane.

The first pane and the second pane are laminated together via the intermediate layer, for example by autoclave processes, vacuum bag processes, vacuum ring processes, calendering processes, vacuum laminators, or combinations thereof. The pane is usually connected under the action of heat, vacuum and/or pressure.

In a further aspect, the present invention comprises a vehicle, In particular a passenger car, having a glazing assembly according to the invention.

In a further aspect, the present invention comprises a method for producing the glazing assembly according to the invention, at least comprising:

providing a first pane, a second pane and a thermoplastic intermediate layer;

applying an absorbing medium in the edge region of the first pane;

burning-in the absorbing medium;

arranging at least one light source on the first pane;

arranging a light outcoupling means on a first surface (IV) and/or on a second surface (III) of the first pane;

connecting the first pane and the second pane via the thermoplastic intermediate layer such that the second surface (III) of the first pane faces the thermoplastic intermediate layer, wherein the absorbing medium is designed as a first cover layer.

If the laminated pane assembly is produced in a screen-printing process, the cover layer is applied before bending the individual panes.

The present invention further comprises the use of the glazing assembly according to the invention in means of transport for traffic on land, in the air or in water, in particular in motor vehicles, for example as a roof panel, rear window and/or side window.

Within the scope of the present invention, all embodiments mentioned for individual features can also be freely combined with one another, provided that they are not contradictory.

In the following, the invention is explained in more detail with reference to drawings and embodiments. The figures are schematic representations and not to scale. The figures do not limit the invention in any way.

Data with numerical values are generally not to be understood as exact values, but also include a tolerance of +/−1% up to +/−10%.

Figure 1:
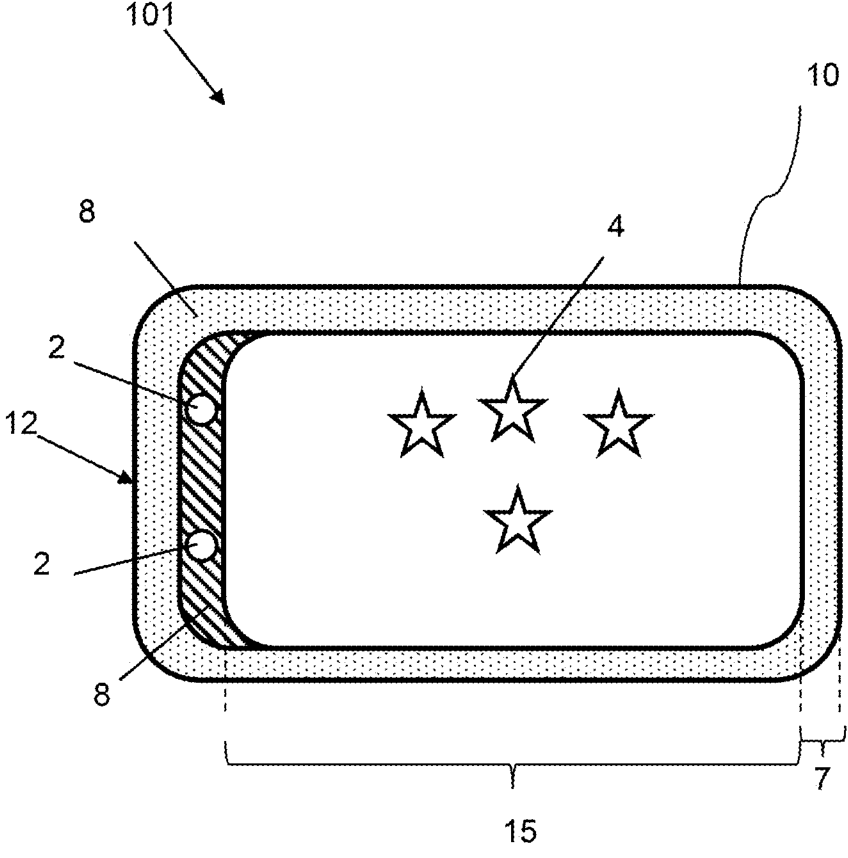
FIG. 1 is a plan view of an embodiment of a laminated pane according to the invention, using the example of a roof panel of a vehicle.

FIG. 1 is a plan view of an embodiment of a glazing assembly 10 according to the invention with a laminated pane 101, using the example of a roof panel for a vehicle. Alternatively, the laminated pane 101 can be an architectural glazing unit, or components of a piece of furniture or electrical device. The glazing assembly 10 can also be part of an insulating glazing unit and can serve, for example, as an outer or inner pane in a window of a building. The glazing assembly 10 can further be installed in an interior and can serve, for example, as glazing for a conference room.

The glazing assembly 10 comprises the laminated pane 101 and two light sources 2. The light sources 2 are provided to emit light in the visible range. Alternatively, they can emit infrared or ultraviolet light. Each light source 2 of the glazing assembly 10 can comprise one or more light-emitting diodes (LED, LED module, LED luminaire). A light source 2 can also comprise an organic light-emitting diode (OLED).

The laminated pane 101 furthermore has four light outcoupling means 4. A light outcoupling means 4 couples light out of the laminated pane 101. The light outcoupling means 4 are arranged on the first surface IV (main surface of the laminated pane 101). The light can exit the laminated pane 101 via the surface IV at the location at which a light outcoupling means 4 is arranged.

The light outcoupling means 4 can be arranged at any desired location of the surface IV. In FIG. 1, the light outcoupling means 4 comprises structuring of the surface IV at which total-internal reflection within the laminated pane 101 is prevented and light exits the laminated pane 101 via the surface IV. Alternatively, the light outcoupling means 4 can comprise an imprint on the surface IV or light-scattering, light-refracting, light-diffracting or light-reflecting particles or cavities introduced or made in the laminated pane 101.

In the present embodiment, the light outcoupling means 4 is furthermore designed as an imprint of fine light-scattering particles on the surface IV, which interrupts the total-internal reflection of a light beam at the boundary between the laminated pane 101 and surrounding air, and light is coupled out of the laminated pane 101 by scattering.

The laminated pane 101 has an absorbing medium 8 in the edge region 7 for absorbing light 3 coupled into the laminated pane 101. The absorbing medium 8 is designed as a first cover layer 9 which extends in the manner of a frame in the edge region 7.

The laminated pane 101 comprises a circumferential pane edge 12, wherein the absorbing medium 8 extends circumferentially along the entire circumferential pane edge 12. Alternatively, the absorbing medium 8 can be arranged, at least in portions, along the circumferential pane edge 12. The width of the edge region 7 is measured starting at the pane edge 12 and is, for example, 10 mm, 50 mm, or 100 mm.

Surprisingly, it has been found that arranging an absorbing medium 8 in the edge region 7 of the laminated pane 101 particularly effectively prevents scattered light at the pane edge 12. This is particularly advantageous for panes whose edge region is not covered when installed. On account of the absorbing medium 8, the free-standing edges are darkened and the luminous patterns (for example stars) formed by the light outcoupling means 4 can be clearly seen.

The laminated pane 101 has a viewing region 15 in which the laminated pane does not have a cover layer. The viewing region 15 of the laminated pane 101 accounts for at least 70% of the surface of the laminated pane.

Figure 2:
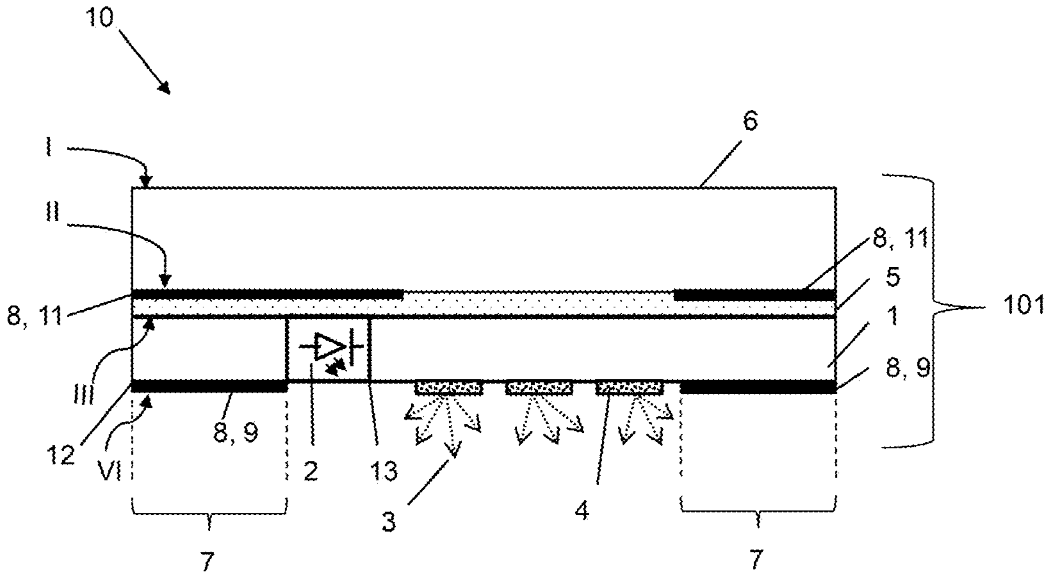
FIG. 2 shows a schematic cross-sectional view of a first embodiment of the glazing assembly according to the invention.

FIG. 2 shows a cross-sectional view of the glazing assembly 10 according to the invention from FIG. 1. The laminated pane 101 comprises a first pane 1, which is connected to a second pane 6 via an intermediate layer 5. The first pane 1, the intermediate layer 5 and the second pane 6 were connected to one another by lamination, in particular by autoclaving. The second pane 6 has a first surface I and a second surface II opposite the first surface I.

The first pane 1 has a first surface IV and a second surface III opposite the first surface IV. The side surfaces of the laminated pane 101 are arranged orthogonally to the surfaces III, IV. The first pane 1 and the second pane 6 are made, for example, of soda lime glass. The thermoplastic intermediate layer 5 is formed, for example, from a 0.76 mm-thick PVB film. The thickness of the first pane 1 is, for example, 1.6 mm and the thickness of the second pane 6 can be, for example, 2.1 mm. The first pane 1 and the second pane 6 can have any thickness, for example the same thickness. The laminated pane 10 is defined by four circumferential side surfaces.

The first pane 1 can have prestressed, partially prestressed or non-prestressed glass. Alternatively, the first pane 1 can consist of a plastics, for example of polycarbonate. The first pane 1, the second pane 6 and the intermediate layer 5 are, for example, clear (neither tinted nor colored). Alternatively, the intermediate layer 5 can have a tinted or colored PVB film. Alternatively or additionally, the second pane 6 can be tinted dark.

The first pane 1 has a recess 13 into which one of the two light sources 2 is inserted. The recess 13 extends continuously from the first surface IV of the first pane 1 up to the second surface III of the first pane 1. The intermediate layer 5 was not removed in the region of the recess 13. The light source 2 is located completely within the laminated pane 101. The light 3 emitted by the light source 2 is directed toward the pane 1. The pane 1 is provided for transmitting the light 3 coupled in through the pane 1 in the longitudinal direction. The first pane 1 preferably represents an inner pane and the second pane 6 preferably represents an outer pane. When installed, the inner pane faces an interior space. When installed, the outer pane faces the external surroundings (e.g., of a vehicle). Due to the position of the light sources 2 in the first pane 1, this arrangement is particularly advantageous since light is coupled out in the direction of a (vehicle) interior, which results in a pleasant atmosphere in the interior. Alternatively, the second pane 6 can also be the inner pane and the first pane 1 can be the outer pane.

The absorbing medium 8 is applied to the first surface IV of the first pane 1. The absorbing medium 8 is designed as a first non-transparent, dark, in particular black or gray, cover layer 9. The first cover layer 9 is made of a printing ink. Since light is not intended to be coupled out at the edges of the laminated pane, the edge region 7 of the first pane 1 has the cover layer 9 which absorbs the scattered light. This is a low-effort way to prevent unwanted scattered light in the edge region 7 of the laminated pane 101.

In addition, a second non-transparent, dark, in particular black or gray black cover layer 11 is arranged on the second surface II of the second pane 6. In particular, the first cover layer 9 and the second cover layer 11 overlap in the viewing direction through the laminated pane 101. The light source 2 is covered by the second cover layer 11 in the viewing direction. The cover layers 9 and 11 are peripheral, i.e., frame-like, cover prints. The cover layers 9 and 11 can be designed to be non-transparent, opaque and/or to cover the entire surface.

The first cover layer 9 and the second cover layer 11 contain pigments and glass frits. They can contain further chemical compounds. The glass frits can be melted or fused and the cover layers 9 and 11 can thus be permanently connected (fused or sintered) to the glass surface. The pigment provides the opacity of the cover layer 9, 11. Such cover layers are applied as an enamel. Alternatively, the first cover layer 9 and/or the second cover layer 11 can be designed as an adhesive tape, color layer or primer. The adhesive tape, color layer and primer are preferably black.

Figure 3:
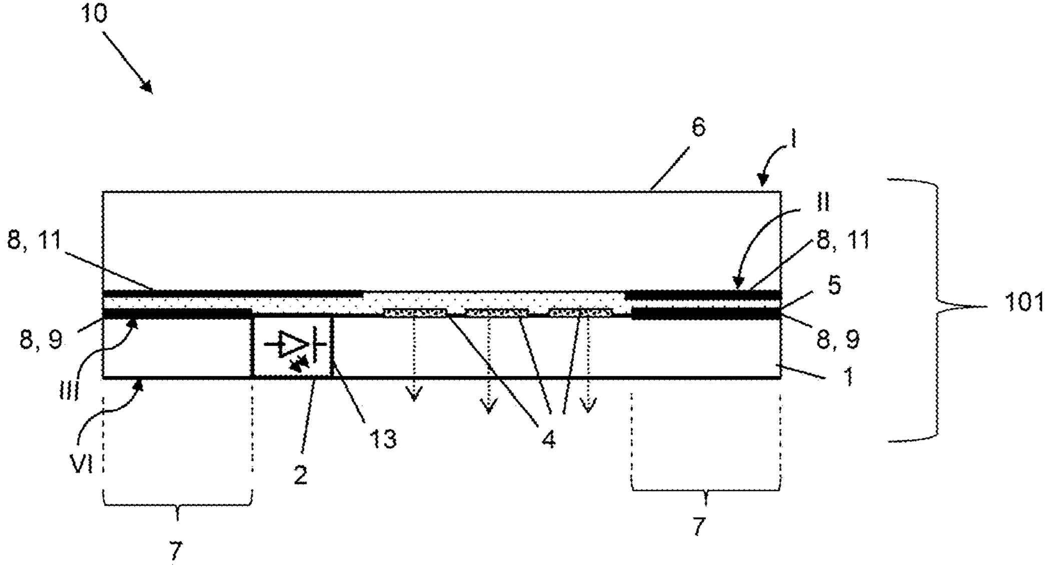
FIG. 3 shows a schematic cross-sectional view of a second embodiment of the glazing assembly according to the invention.

FIG. 3 shows a schematic cross-sectional view of a second embodiment of the glazing assembly 10 according to the invention. The glazing assembly 10 shown in FIG. 3 is particularly well suited as a roof panel of a motor vehicle. The glazing assembly 10 of FIG. 3 has a structure similar to that of the glazing assembly 10 of FIG. 2. The second pane 6 (outer pane) resembles the pane 6 of FIG. 2. However, unlike in FIG. 2, the first cover layer 9 is applied as an absorbing medium 8 to the second surface III of the first pane 1. In the present second embodiment, the light outcoupling means 4 is designed as an imprint of fine light-scattering particles on the surface III.

The first pane 1 is intended, for example, to face an interior of a vehicle when installed. The first surface IV of the first pane 1 is accessible from the interior, whereas the first surface I of the second pane 6 faces outward relative to the vehicle interior.

LIST OF REFERENCE SIGNS

1 First pane
2 Light source
3 Light
4 Light outcoupling means
5 intermediate layer
6 Second pane
7 Edge region
8 Absorbing medium
9 First cover layer
10 Glazing assembly
11 Second cover layer
12 Pane edge
13 Recess
15 Viewing region
101 Laminated pane
I First surface of the second pane 6
II Second surface of the second pane 6
III Second surface of the first pane 1
IV First surface of the first pane 1

The invention claimed is:

1. A glazing assembly, comprising:

a first pane having a first surface and a second surface, wherein the first pane is provided to transmit at least some coupled-in light, wherein the first pane is connected to a second pane via an intermediate layer to form a laminated pane;

a light source for generating light that can be coupled into the first pane;

a light outcoupling means for coupling light out of the first pane via one of the first and second surfaces;

an edge region which extends from a pane edge of the first pane over at least 1 mm to at most 500 mm on one of the first and second surfaces; and an absorbing medium for absorbing light coupled into the first pane, which absorbing medium is arranged in the edge region, wherein the absorbing medium is designed as a first cover layer arranged on the first surface and/or on the second surface of the first pane, wherein the first pane has at least one recess for receiving the light source, and wherein the first cover layer extends from the pane edge to the recess in which the light source is arranged.

2. The glazing assembly according to claim 1, wherein the second pane has a second cover layer.

3. The glazing assembly according to claim 2, wherein the first cover layer and/or the second cover layer is/are non-transparent.

4. The glazing assembly according to claim 1, wherein the first cover layer extends from the pane edge of the first pane over 1 mm to 500 mm.

5. The glazing assembly according to claim 1, wherein the absorbing medium is arranged, at least in portions, along a circumferential pane edge of the laminated pane, or the absorbing medium extends circumferentially along the entire circumferential pane edge.

6. The glazing assembly according to claim 2, wherein the first cover layer and/or the second cover layer is/are designed as an opaque enamel, adhesive tape, or primer.

7. The glazing assembly according to claim 6, wherein the enamel contains glass frits and/or mineral frits and optionally at least one pigment.

8. The glazing assembly according to claim 2, wherein the first cover layer and the second cover layer overlap at least partially in a viewing direction through the laminated pane.

9. The glazing assembly according to claim 1, wherein the light source comprises at least one or more light-emitting diodes.

10. The glazing assembly according to claim 1, wherein the laminated pane is a roof panel of a motor vehicle and the first pane is the inner pane and the second pane is the outer pane.

11. A comprising a glazing assembly according to claim 1.

12. A method for producing a glazing assembly according to claim 1, comprising:

providing a first pane, a second pane and a thermoplastic intermediate layer;

applying an absorbing medium in the edge region of the first pane;

burning-in the absorbing medium;

arranging at least one light source on the first pane;

arranging a light outcoupling means on a first surface and/or on a second surface of the first pane;

connecting the first pane and the second pane via the thermoplastic intermediate layer such that the second surface of the first pane faces the thermoplastic intermediate layer, wherein the absorbing medium is designed as a first cover layer.

13. A method comprising providing the glazing assembly according to claim 1 in means of transport for traffic on land, in the air or in water.

14. The glazing assembly according to claim 4, wherein the first cover layer extends from the pane edge of the first pane over 10 mm to 150 mm.

15. The glazing assembly according to claim 14, wherein the first cover layer extends from the pane edge of the first pane over 10 mm to 15 mm.

16. The glazing assembly according to claim 7, wherein the enamel contains glass frits and/or mineral frits based on oxides selected from boron, bismuth, zinc, silicon, aluminum and sodium.

17. The vehicle according to claim 11, wherein the vehicle is a passenger car.

18. The method according to claim 13, wherein the means of transport is a train, a ship or a motor vehicle.

19. The method according to claim 13, wherein the glazing assembly is a roof panel, a rear window or a side window.

* * * * *